(12) United States Patent
Horiguchi

(10) Patent No.: US 8,953,185 B2
(45) Date of Patent: *Feb. 10, 2015

(54) IMAGE READING APPARATUS AND IMAGE FORMING APPARATUS

(71) Applicant: KYOCERA Document Solutions Inc., Osaka-shi, Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 173 days.

This patent is subject to a terminal disclaimer.

(21) Appl. No.: 13/678,606

(22) Filed: Nov. 16, 2012

(65) Prior Publication Data

US 2013/0135645 A1 May 30, 2013

(30) Foreign Application Priority Data

Nov. 30, 2011 (JP) ................................ 2011-261896

(51) Int. Cl.
*G06F 3/12* (2006.01)
*G06K 15/02* (2006.01)
*H04N 1/00* (2006.01)
*H04N 1/12* (2006.01)
*H04N 1/04* (2006.01)

(52) U.S. Cl.
CPC ................. *G06K 15/02* (2013.01); *H04N 1/00* (2013.01); *H04N 1/00591* (2013.01); *H04N 1/00602* (2013.01); *H04N 1/00615* (2013.01); *H04N 1/00631* (2013.01); *H04N 1/1235* (2013.01); *H04N 1/00522* (2013.01); *H04N 1/00527* (2013.01); *H04N 2201/0456* (2013.01); *H04N 2201/0091* (2013.01)
USPC .......................................... 358/1.13; 358/498

(58) Field of Classification Search
CPC . H04N 1/00278; H04N 1/00; H04N 1/00591; G03G 15/602
See application file for complete search history.

(56) References Cited

U.S. PATENT DOCUMENTS

| 8,302,952 B2 * | 11/2012 | Kano ........................... 271/3.14 |
| 2004/0004320 A1 * | 1/2004 | Watanabe et al. .......... 271/10.01 |
| 2007/0145662 A1 * | 6/2007 | Yamada ........................ 271/3.2 |

FOREIGN PATENT DOCUMENTS

| JP | 2009094965 A | * | 4/2009 |
| JP | 2010-41481 | | 2/2010 |

* cited by examiner

*Primary Examiner* — Ashish K Thomas
*Assistant Examiner* — Neil R McLean
(74) *Attorney, Agent, or Firm* — Gerald E. Hespos; Michael J. Porco; Matthew T. Hespos

(57) ABSTRACT

An image reading apparatus includes a first housing, a second housing, a document conveyance path, a plate-like transparent member, a reader, a guide member, a transparent sheet member and a pressing member. The guide member is arranged on the transparent member at a side downstream of the first position in a conveying direction of the document and guides the document to a downstream side in the conveying direction. The transparent sheet member includes a first sheet portion which is arranged on the transparent member to cover the first position and a second sheet portion which is held in contact with the guide member and with which the document being conveyed along the document conveyance path comes into contact. The pressing member presses a side of the first sheet portion upstream of the first position in the conveying direction against the transparent member.

8 Claims, 8 Drawing Sheets

IMAGE READING APPARATUS AND IMAGE FORMING APPARATUS

This application is based on Japanese Patent Application Serial No. 2011-261896 filed with the Japan Patent Office on Nov. 30, 2011, the contents of which are hereby incorporated by reference.

BACKGROUND

The present disclosure relates to an image reading apparatus and an image forming apparatus.

Two methods, i.e. stationary document reading and fed document reading are known as a reading method of an image forming apparatus. In the stationary document reading method, a document is placed on a contact glass and pressed against the contact glass by a platen mat, a document feeder or the like and a document image is read by the scanning of a reading unit. On the other hand, in the fed document reading method, a reading unit is fixed at a predetermined position and a document image is read while a document is fed on the reading unit.

In the fed document reading method, a document discharge guide is arranged downstream of a document reading position to separate a document fed to the document reading position from the contact glass. If there are two contact glasses, i.e. a contact glass for stationary document reading and a contact glass for fed document reading, a base end part of the document discharge guide is arranged under the contact glass for fed document reading utilizing a space between the two contact glasses. On the other hand, if there is one contact glass, the document discharge guide is arranged on the contact glass. In this case, a problem occurs in which the leading end of a document being fed collides with the document discharge guide. To solve such a problem, a transparent reading sheet may be provided between the contact glass and the document being fed and an image may be read via the transparent reading sheet and the contact glass.

In the above disclosure, a document passes the document reading position while being rubbed against the transparent reading sheet. Thus, hard coating is applied to a document conveyance surface of the transparent reading sheet. However, even if such hard coating is applied, the transparent reading sheet is scratched depending on a document to be fed. If the transparent reading sheet is scratched, the reading light quantity of the scratched part decreases, a blank part of the document becomes a dark image (fogged image) and a black part of the document becomes a bright image due to light reflection on the sheet. Further, hard coating applied to the transparent reading sheet leads to a cost increase of the transparent reading sheet itself.

The present disclosure was developed in view of the above problem and an object thereof is to provide an image reading apparatus in which a transparent reading sheet and a document being fed are difficult to scratch and an image forming apparatus provided with the same.

SUMMARY

An image reading apparatus according to one aspect of the present disclosure includes a first housing, a second housing, a document conveyance path, a plate-like transparent member, a reader, a guide member, a transparent sheet member and a pressing member. The second housing is openable and closable relative to the first housing. The document conveyance path is arranged in the second housing and conveys a document so that the document passes a first position on the first housing facing the second housing in a closed state. The plate-like transparent member is so arranged opposite to the second housing in the first housing as to include the first position and a second position which is adjacent to the first position and where a stationary document is placed on the upper surface of the transparent member with a document surface faced down. The reader is arranged in the first housing and reads an image of the document or the stationary document at the first or second position via the transparent member. The guide member is arranged on the transparent member at a side downstream of the first position in a conveying direction of the document and guides the document to a downstream side in the conveying direction. The transparent sheet member includes a first sheet portion which is arranged on the transparent member to cover the first position from the upstream side to the downstream side in the conveying direction and a second sheet portion which is held in contact with the guide member to extend along the guide member and with which the document being conveyed along the document conveyance path comes into contact. The pressing member presses a side of the first sheet portion upstream of the first position in the conveying direction against the transparent member and the document being conveyed along the document conveyance path comes into contact therewith.

These and other objects, features and advantages of the present disclosure will become more apparent upon reading the following detailed description along with the accompanying drawings.

DETAILED DESCRIPTION

Figure 1:
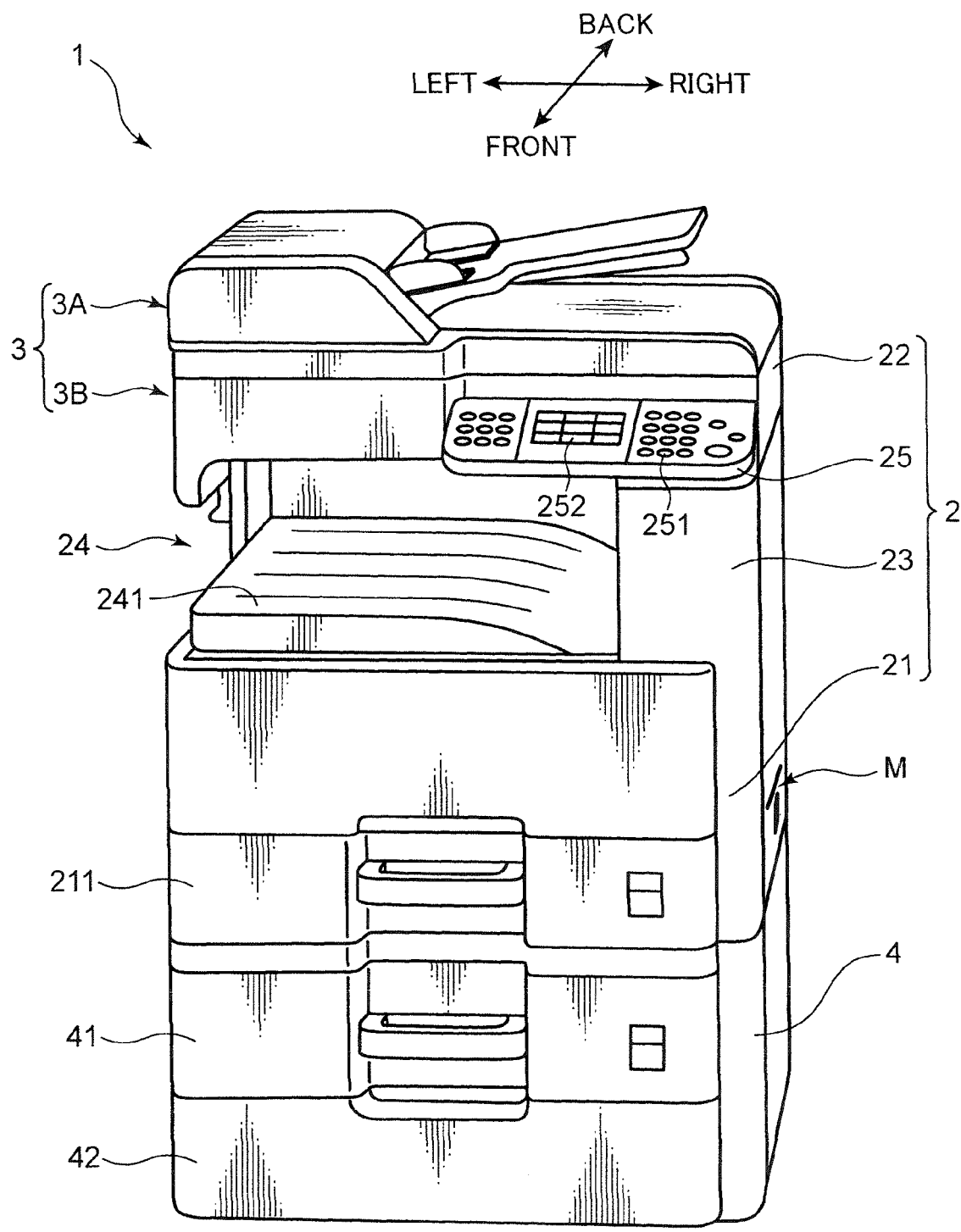
FIG. 1 is a perspective view of an image forming apparatus according to one embodiment of the present disclosure.

Hereinafter, an embodiment of the present disclosure is described based on the drawings. An image forming apparatus 1 includes an apparatus main body 2, an auto document feeder 3A (second housing) arranged on the upper surface of the apparatus main body 2 and an extended sheet feeding unit 4 assembled below the apparatus main body 2.

The apparatus main body 2 includes a lower housing 21, a substantially rectangular parallelepipedic upper housing 22 (first housing) arranged above the lower housing 21, and a coupling housing 23 coupling the lower housing 21 and the upper housing 22. Various devices for image formation are housed in the lower housing 21, and an image reading unit 3B for optically reading a document image is housed in the upper housing 22. An image reading apparatus 3 is constituted by the auto document feeder 3A and the image reading unit 3B. The coupling housing 23 is arranged on the right surface side of the apparatus main body 2 and provided with a discharge opening 961 (FIG. 3) for discharging a sheet to an internal discharging portion 24.

A bottom surface 241 of the internal discharging portion is defined by the upper surface of the lower housing 21 and sheets discharged through the discharge openings 961 are stacked thereon.

An operation panel unit 25 is provided to project from the front surface of the upper housing 22. The operation panel unit 25 includes operation keys 251, an LCD touch panel 252 and the like.

Figure 3:
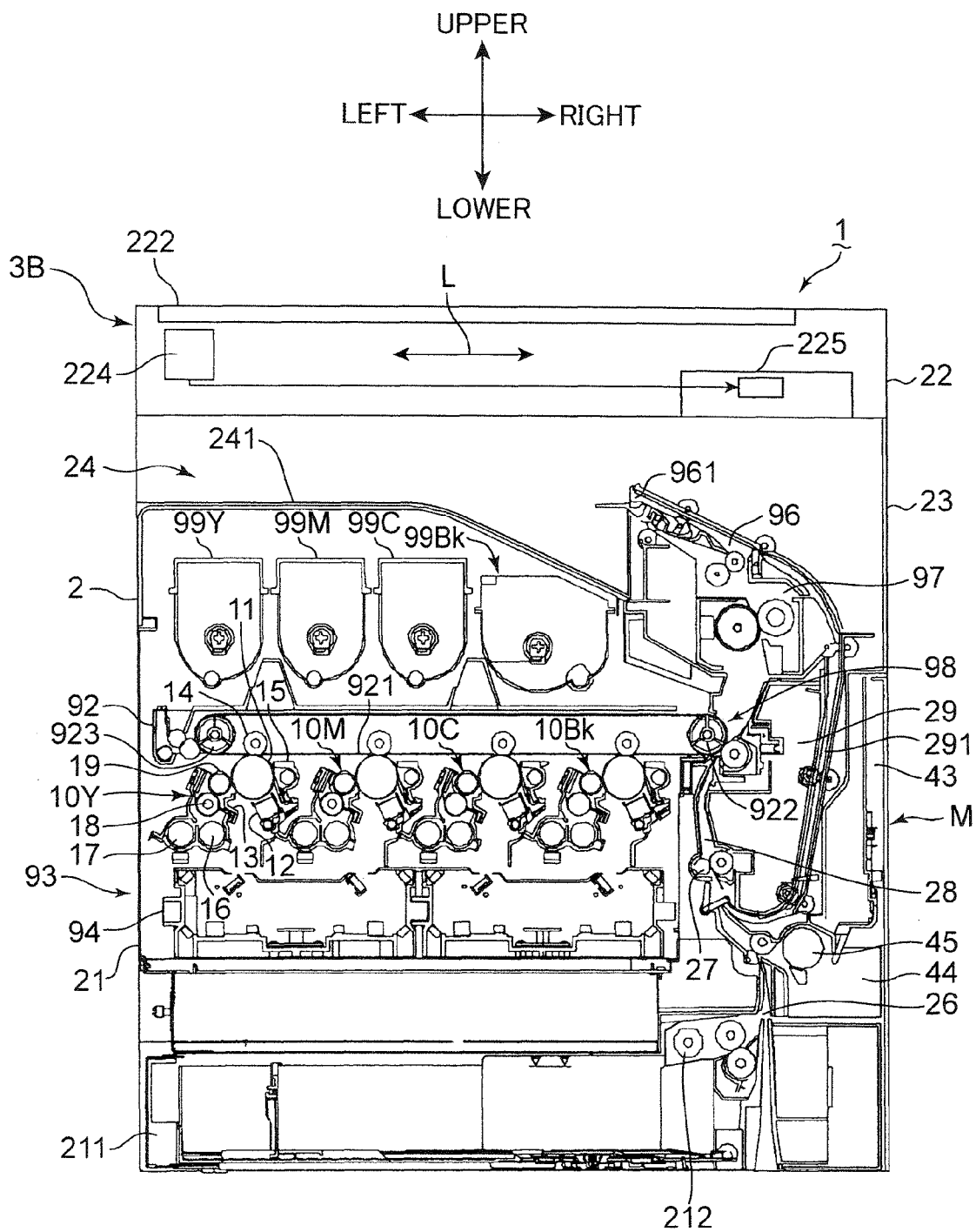
FIG. 3 is a sectional view showing the internal structure of the image forming apparatus according to the embodiment of the present disclosure.

A sheet cassette 211 for storing recording sheets to which an image forming process is to be applied is mounted in the lower housing 21. The extended sheet feeding unit 4 also includes sheet cassettes 41, 42 for storing recording sheets to which the image forming process is to be applied. Note that only the sheet cassette 211 of the lower housing 21 is shown in FIG. 3.

A multi-tray unit M to be used by a user to manually feed a sheet is mounted on the right side surface of the apparatus main body 2. The multi-tray unit M includes a sheet feed tray 43 on which a recording sheet to be manually fed is to be placed, and a sheet feeding unit 44 for feeding the recording sheet to an image forming station in the lower housing 21. The sheet feed tray 43 is openably and closably mounted to the lower housing 21 at its lower end part and is closed when not in use.

The auto document feeder 3A is rotatably mounted on the upper surface of the apparatus main body 2 at its rear side. Note that this auto document feeder 3A is not shown in FIG. 3. When the user places a document sheet at a predetermined document reading position, the auto document feeder 3A is opened upward.

Figure 2:
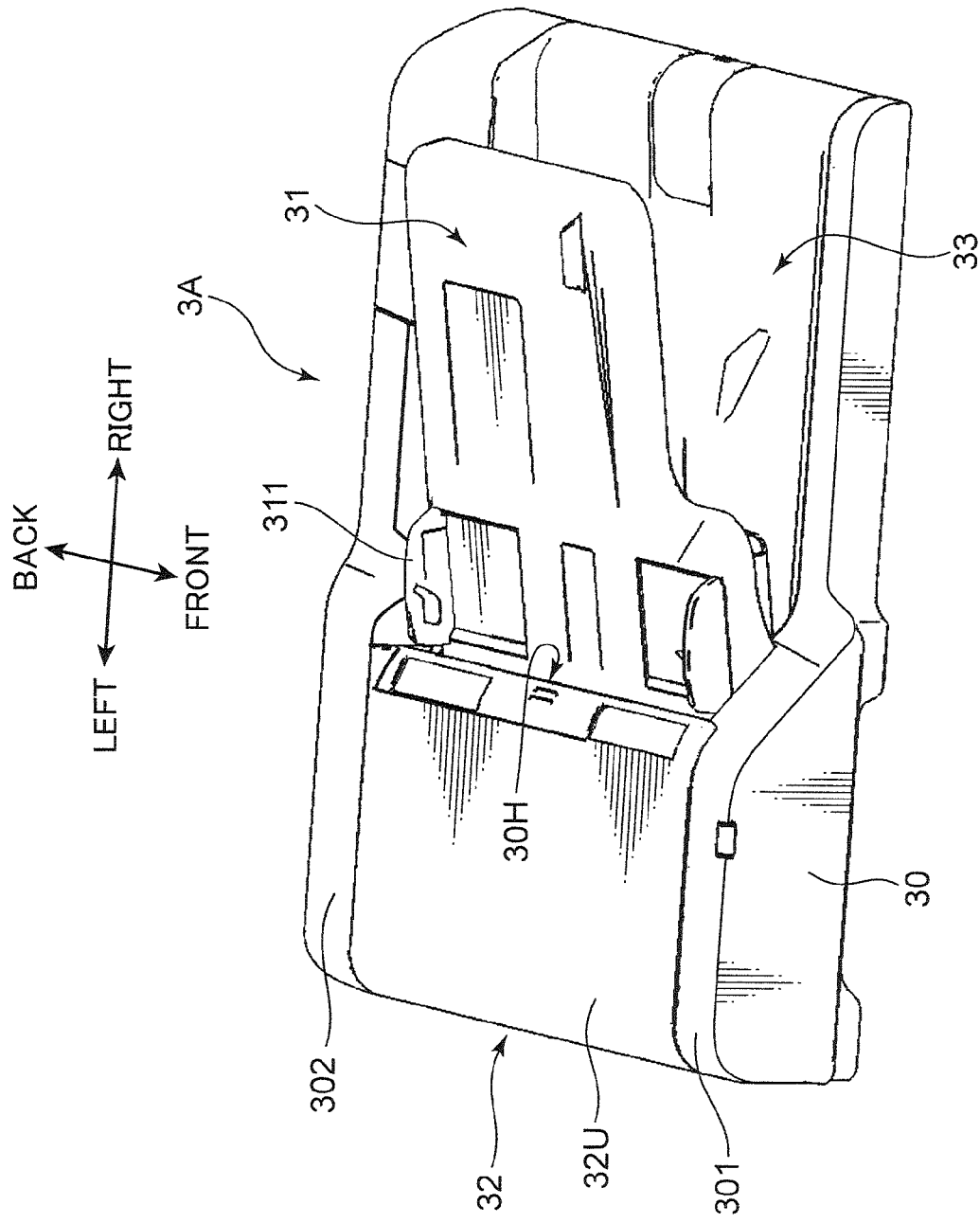
FIG. 2 is a perspective view of an auto document feeder according to the embodiment of the present disclosure.

With reference to FIG. 2, the auto document feeder 3A includes a main housing 30, a document feed tray 31, a document conveying unit 32 and a document discharge tray 33. The main housing 30 is a housing for housing various mechanisms provided in the auto document feeder 3A. The auto document feeder 3A includes a front wall portion 301 and a rear wall portion 302 extending upward on a left side where the document conveying unit 32 is housed and a substantially flat low-rise part on a right side.

The document feed tray 31 is a tray on which a document sheet to be fed to an image reading position is to be placed, and is attached to the main housing 30 to extend from a feed opening 30H of the main housing 30. A pair of cursors 311 for aligning the width of a placed document sheet is provided on the document feed tray 31.

The document conveying unit 32 includes a conveyance path and a conveying mechanism for conveying a document sheet on the document feed tray 31 to the document discharge tray 33 via the image reading position. The document conveying unit 32 includes an upper cover unit 32U fitted into an opening between the front wall portion 301 and the rear wall portion 302 of the main housing 30. These are described in detail later based on FIG. 4.

The document discharge tray 33 is a tray to which a document sheet is to be discharged. The upper surface of the low-rise part on the right side of the main housing 30 serves as the document discharge tray 33.

Next, the internal structure of the apparatus main body 2 is descried based on FIG. 3. Toner containers 99Y, 99M, 99C and 99Bk, an intermediate transfer unit 92, the image forming station 93, an exposure unit 94 and the above sheet cassette 211 are housed in this order from top in the lower housing 21.

The image forming station 93 includes four image forming units 10Y, 10M, 10C and 10Bk for forming toner images of yellow (Y), magenta (M), cyan (C) and black (Bk) to form a full color toner image. Each of the image forming units 10Y, 10M, 10C and 10Bk includes a photoconductive drum 11, a charger 12, a developing device 13, a primary transfer roller 14 and a cleaning device 15 arranged around this photoconductive drum 11.

The photoconductive drum 11 is rotated about its shaft. The charger 12 uniformly charges a surface of the photoconductive drum 11. The charged circumferential surface of the photoconductive drum 11 is exposed to light by the exposure unit 94, whereby an electrostatic latent image is formed.

The developing device 13 supplies the toner to the circumferential surface of the photoconductive drum 11 to develop an electrostatic latent image formed on the photoconductive drum 11. The developing device 13 is for two-component developer and includes agitating rollers 16, 17, a magnetic roller 18 and a developing roller 19. The toner on the developing roller 19 is supplied to the circumferential surface of the photoconductive drum 11, whereby the electrostatic latent image is developed.

The primary transfer roller 14 forms a nip portion in cooperation with the photoconductive drum 11 while sandwiching an intermediate transfer belt 92 provided in the intermediate transfer unit 92, and primarily transfers a toner image on the photoconductive drum 11 to the intermediate transfer belt 921. The cleaning device 15 cleans the circumferential surface of the photoconductive drum 11 after the transfer of the toner image.

The yellow toner container 99Y, the magenta toner container 99M, the cyan toner container 99C and the black toner container 99Bk are respectively for storing the toners of the respective colors, and supply the toners of the respective colors to the developing devices 13 of the image forming units 10Y, 10M, 10C and 10Bk corresponding to the respective colors YMCBk through unillustrated supply paths.

The exposure unit 94 irradiates light to the circumferential surface of the photoconductive drum 11 to form an electrostatic latent image.

The intermediate transfer unit 92 includes the intermediate transfer belt 921, a drive roller 922 and a driven roller 923. Toner images from a plurality of photoconductive drums 11 are superimposed (primary transfer) on the intermediate transfer belt 921. The superimposed toner images are secondarily transferred to a recording sheet fed from the sheet cassette 211 in a secondary transfer unit 98. The drive roller 922 and the driven roller 923 for driving and turning the intermediate transfer belt 921 are rotatably supported on the lower housing 21.

A feed roller 212 is arranged above the right end side of the sheet cassette 211. By driving the feed roller 212, the uppermost recording sheet of a sheet stack in the sheet cassette 211 is fed one by one and conveyed into a carry-in conveyance path 26. On the other hand, a recording sheet placed on the sheet feed tray 43 to be manually fed is carried into the carry-in conveyance path 26 by driving a conveyor roller 45 of the sheet feeding unit 44.

A conveyance path 28 extending up to the discharge opening 961 via the secondary transfer unit 98, a fixing unit 97 and a discharge unit 96 to be described later is provided at a downstream side of the carry-in conveyance path 26. An upstream part of the conveyance path 28 is formed between an inner wall formed in the lower housing 21 and an inner wall forming the inner side surface of a revering unit 29. Note that the outer side surface of the reversing unit 29 forms one surface of a reversing conveyance path 291 in which a sheet is reversed and conveyed at the time of two-sided printing. A registration roller pair 27 is arranged on a side of the conveyance path 28 upstream of the secondary transfer unit 98. The sheet is caused to temporarily stop at the registration roller pair 27 and fed to the secondary transfer unit 98 at a predetermined timing for image transfer after a skew correction is made.

The fixing unit 97 and the discharge unit 96 are housed in the coupling housing 23. The fixing unit 97 includes a fixing roller and a pressure roller and applies a fixing process by heating and pressing a recording sheet having a toner image secondarily transferred in the secondary transfer unit 98. The recording sheet with a color image, to which the fixing process was applied, is discharged toward the internal discharging portion through the discharge opening 961 by the discharge unit 96 arranged downstream of the fixing unit 97.

The image reading unit 3B is arranged in the upper housing 22 (second housing). The image reading unit 3B includes a contact glass 222 (transparent member), a CIS unit 224 (reader), and an image processing unit 225 (image corrector). The contact glass 222 faces a document sheet automatically fed from the auto document feeder 3A and a stationary document placed on the upper surface thereof with a document surface faced down, and serves as a reading surface for reading images of these documents.

The CIS unit 224 optically reads document information of a document sheet. The CIS unit 224 includes unillustrated LED light source, GRIN (Graded-Index) lenses and CIS (Contact Image Sensor). Reflected light from a document illuminated by the LED light source is photoelectrically converted by the linearly arranged CIS via the GRIN lenses arranged in an array to read a document image. Image data of the document image photoelectrically converted by the CIS is sent to the image processing unit 225. The image processing unit 225 performs various image processings on the image data in accordance with document image reading conditions and then sends the processed image data to the exposure unit 94.

Figure 4:
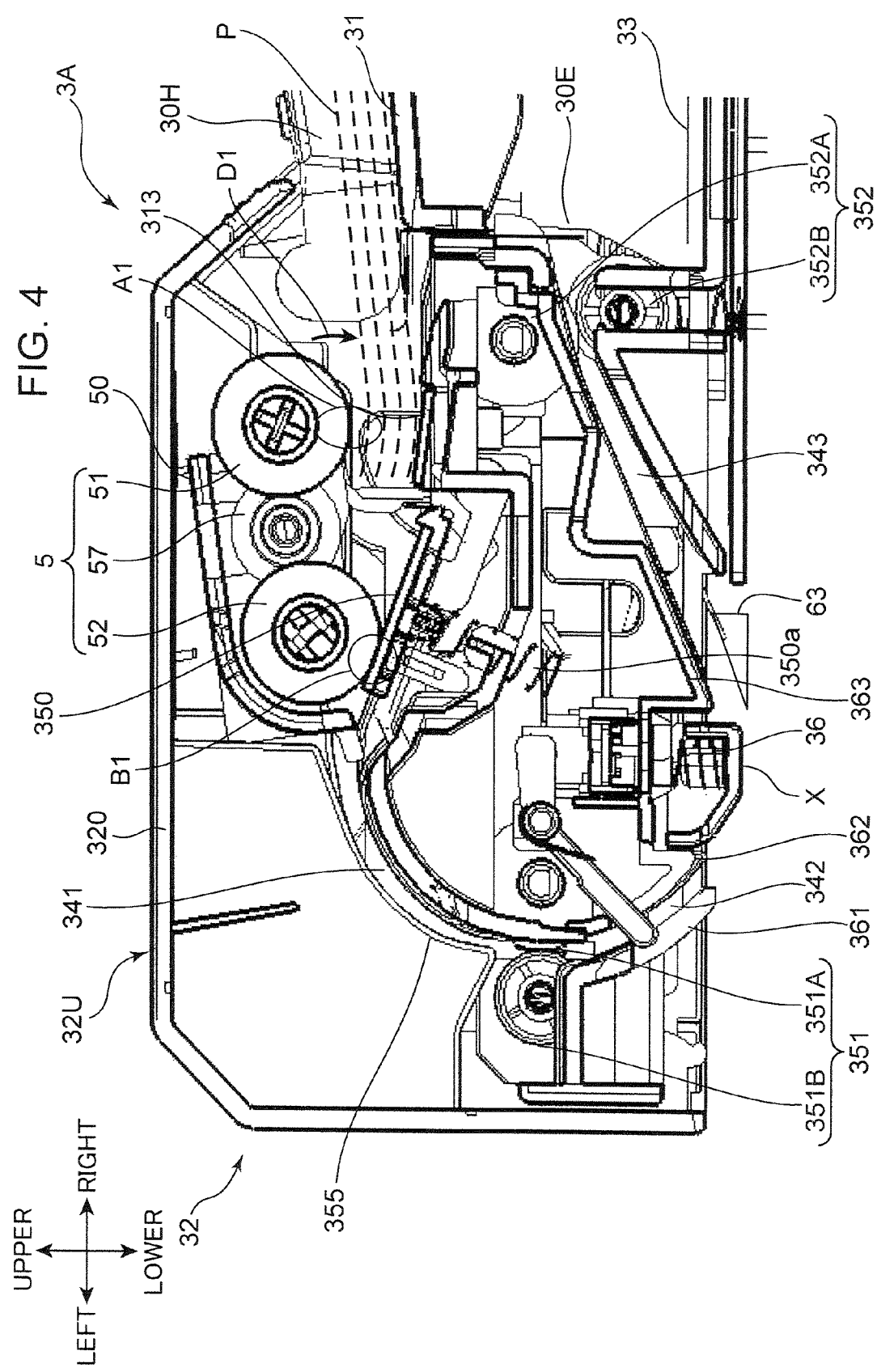
FIG. 4 is a sectional view of a document conveying unit which is an essential part of the auto document feeder according to the embodiment of the present disclosure.

Next, the internal structure of the auto document feeder 3A is described in detail based on FIG. 4. FIG. 4 is a sectional view of the document conveying unit 32 that is an essential part of the auto document feeder 3A. The document conveying unit 32 includes first to third conveyance paths 341 to 343 (document conveyance path) which serve as a conveyance path for a document sheet P, a first conveyor roller pair 351 and a second conveyor roller pair 352 arranged at appropriate positions of the first to third conveyance paths 341 to 343, and a document feeding unit 5 for feeding a document sheet placed on the document feed tray 31 into the document conveying unit 32.

The first, second and third conveyance paths 341, 342 and 343 form a U-shaped sheet conveyance path extending from the above feed opening 30H to a discharge opening 30E for discharging a document sheet P to the document discharge tray 33 via an optical document reading position X (first position) for an image of a document being fed.

The first conveyance path 341 is a conveyance path connected to the document feed tray 31 and extends somewhat downward to the left from the feed opening 30H to the first conveyor roller pair 351 while forming a substantially arcuate shape. A document sheet fed from the document feeding unit 5 first passes along the first conveyance path 341. An upper conveyance surface of this first conveyance path 341 is defined by a first guide member 355 of the upper cover unit 32U.

The second conveyance path 342 is an arcuate conveyance path extending from a downstream end of the first conveyance path 341 to a position facing a contact surface guide 36 forming the document reading position X. Note that the contact surface guide 36 is arranged to face the contact glass 222 (FIG. 3) and forms the document reading position X between itself and the contact glass 222. A lower conveyance surface of the second conveyance path 342 is defined by an arcuate second guide member 361 and an upper conveyance surface thereof is defined by an arcuate third guide member 362 arranged to face the second guide member 361.

The third conveyance path 343 is a conveyance path extending somewhat upward to the right from the position facing the contact surface guide 36 to the discharge opening 30E. An entrance side of the third conveyance path 343 is defined by a later-described document discharge guide 63 arranged on the contact glass 222 and a fourth guide member 363 arranged to face the document discharge guide 63 from above.

The document feeding unit 5 is arranged at an entrance side of the first conveyance path 341. Further, the document feeding unit 5 is mounted on the lower surface of the upper cover unit 32U. The document feeding unit 5 includes a holder 50 for supporting each component, a pickup roller 51, a document feed roller 52 arranged downstream of and at a predetermined distance from the pickup roller 51 in a sheet conveying direction, and an idler gear 57 for transmitting a drive between the pickup roller 51 and the document feed roller 52.

The pickup roller 51 is driven and rotated by an unillustrated driving mechanism and feeds a document sheet P placed on the document feed tray 31 toward the first conveyance path 341. As shown in FIG. 4, an opposed pad 313 is arranged at a position facing the pickup roller 51 at a downstream end of the document feed tray 31 of the main housing 30. The pickup roller is rotated in a direction of an arrow D1 by an unillustrated rotating mechanism to come into contact with the document sheet P. Then, a nip portion A1 for sandwiching the document sheet P is formed between the pickup roller 51 and the opposed pad 313.

The document feed roller 52 is driven and rotated by an unillustrated driving mechanism and conveys document sheets fed from the pickup roller 51 one by one further toward a downstream side of the first conveyance path 341. As shown in FIG. 4, a separation pad 350 is arranged to face the document feed roller 52 from below in the main housing 30. A spring member 350a for pressing the separation pad 350 upward is arranged further below the separation pad 350. A nip portion B1 is formed between the document feed roller 52 and the separation pad 350 by a pressing force of the spring member 350a.

Each of the first and second conveyor roller pairs 351, 352 is composed of a combination of a drive roller 351A, 352A for generating a rotational drive force to convey a document sheet and a driven roller 351B, 353B held in contact with the drive roller 351A, 352A to be rotated.

The first conveyor roller pair 351 is arranged between the first and second conveyance paths 341, 342 and conveys a document sheet fed from the document feeding unit 5 toward the document reading position X. The second conveyor roller pair 352 is arranged at a final end of the third conveyance path 343 and conveys a document sheet P, whose image was read at the document reading position X, from the discharge opening 30E toward the document discharge tray 33.

Next, the configuration of the image reading unit 3B according to this embodiment is described with reference to FIGS. 5 to 8.

Figure 5:
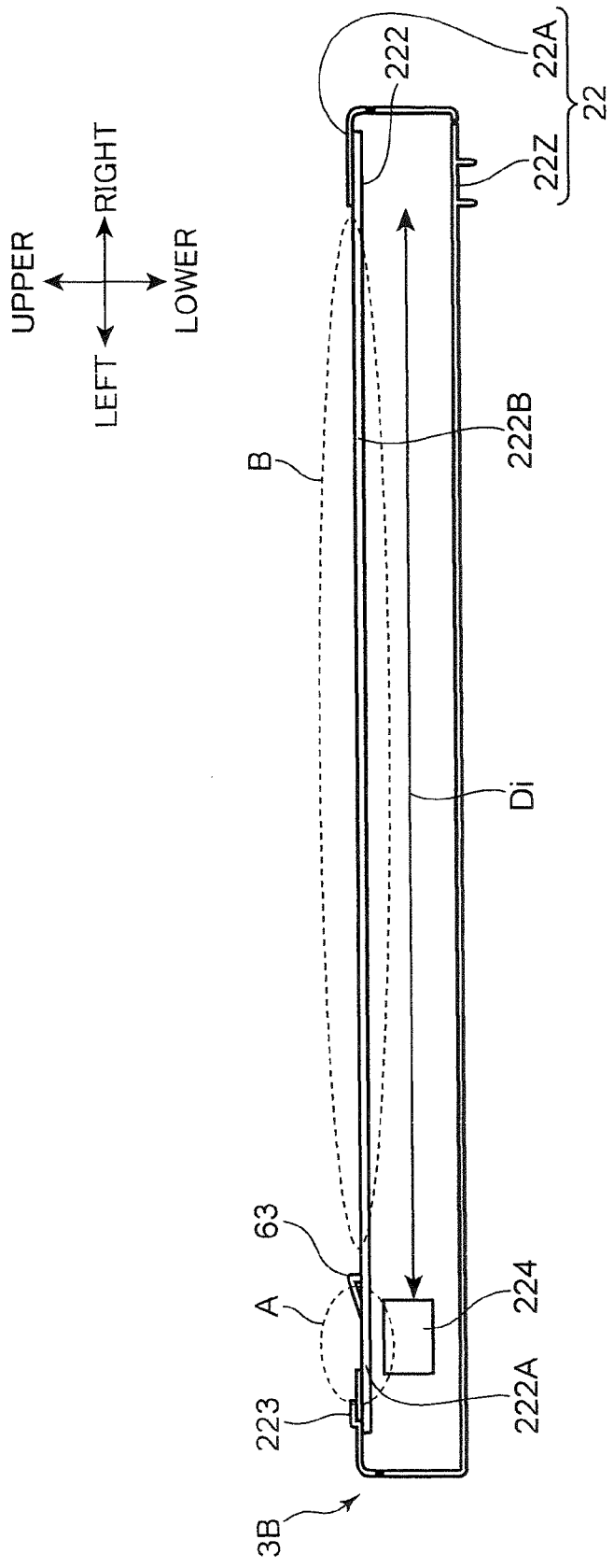
FIG. 5 is a sectional view showing an image reading unit according to the embodiment of the present disclosure.

With reference to FIG. 5, the image reading unit 3B is housed in the upper housing 22. The upper housing 22 (first housing) includes an upper frame 22A, a lower frame 22Z, the document discharge guide 63 (guide member) and a side frame 223. An upper part of the upper housing 22 is defined by the upper frame 22A and a lower part thereof is defined by the lower frame 22Z. Specifically, the box-shaped upper housing 22 is formed by combining the upper frame 22A and the lower frame 22Z.

Figure 6:
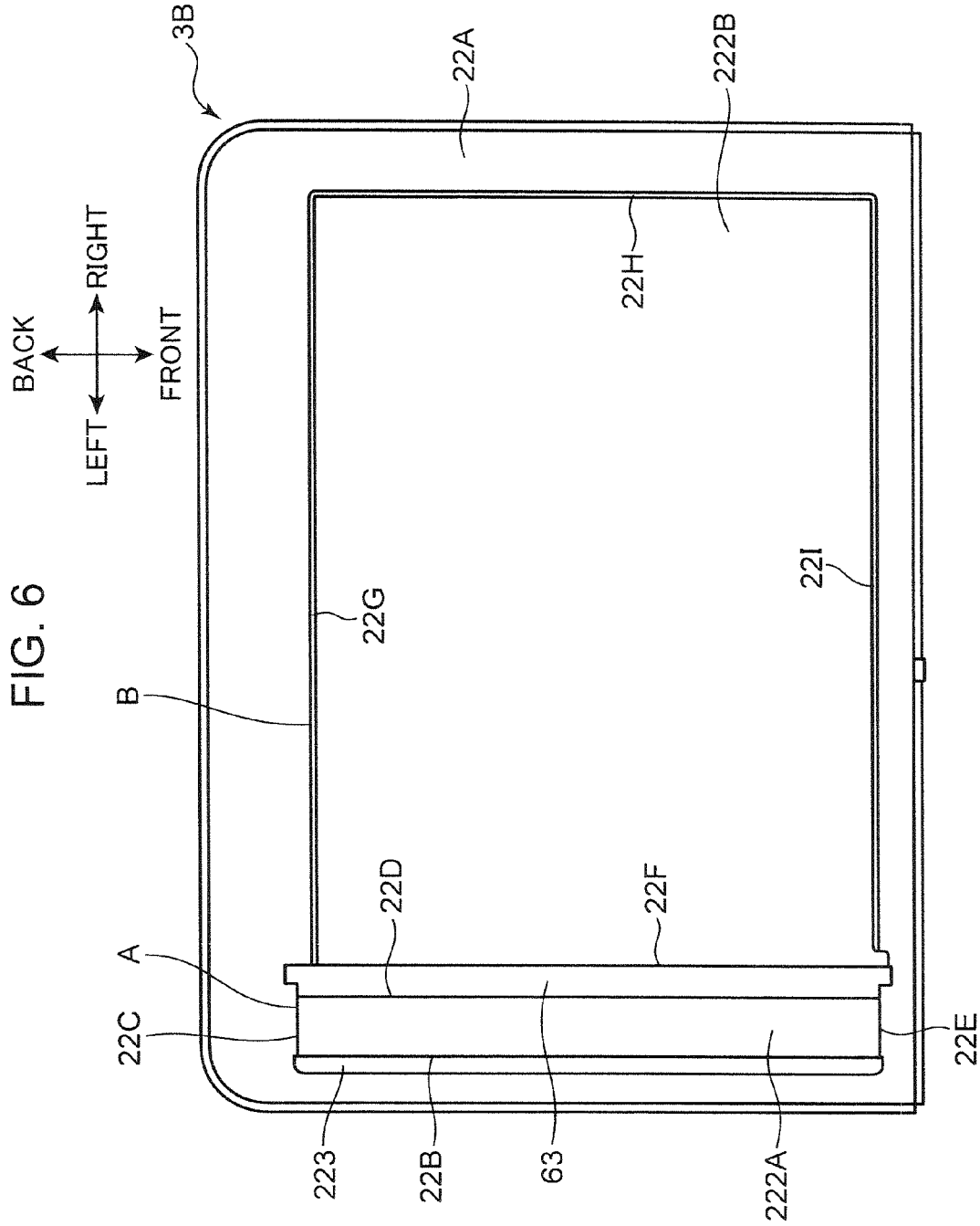
FIG. 6 is a plan view of the image reading unit according to the embodiment of the present disclosure.

With reference to FIG. 6, in the upper frame 22A, two openings which are open upward are respectively formed as a reading area A and a reading area B. A boundary between the reading areas A and B is defined by the document discharge guide 63 described later. The reading area A is an area including the document reading position X (first position) where an image of a document being conveyed by the auto document feeder 3A is read, and the reading area B (second position) is an area where an image of a stationary document placed on the contact glass 222 is read. The reading area A is formed to be narrow and long in forward and backward directions on the left end of the upper frame 22A and four sides thereof are defined by an $11^{th}$ opening side 22B, a $12^{th}$ opening side 22C, a $13^{th}$ opening side 22D and a $14^{th}$ opening edge 22E. On the other hand, the reading area B is formed to the right of, at a predetermined distance from and adjacent to the reading area A. The reading area B is formed to spread from the vicinity of the right side of the reading area A to the vicinity of the right end of the upper frame 22A. Four sides of the reading area B are defined by a $21^{st}$ opening side 22F, a $22^{nd}$ opening side 22G, a $23^{rd}$ opening side 22H and a $24^{th}$ opening edge 22I.

With reference to FIGS. 5 and 6, the contact glass 222 (transparent member) is inserted from the underside of the upper frame 22A and fixed to the upper frame 22A to close the reading areas A and B from below. In this embodiment, the contact glass 222 is formed of a single glass plate. A document sheet conveyed by the auto document feeder 3A faces a part of the contact glass 222 arranged in the reading area A and a stationary document is placed on the upper surface of a part of the contact glass 222 arranged in the reading area B (second position) with a document surface faced down. The CIS unit 224 is arranged to be movable by an unillustrated moving mechanism from the reading area A to the right end of the reading area B to read these document images (an arrow Di in FIG. 5).

Figure 8:
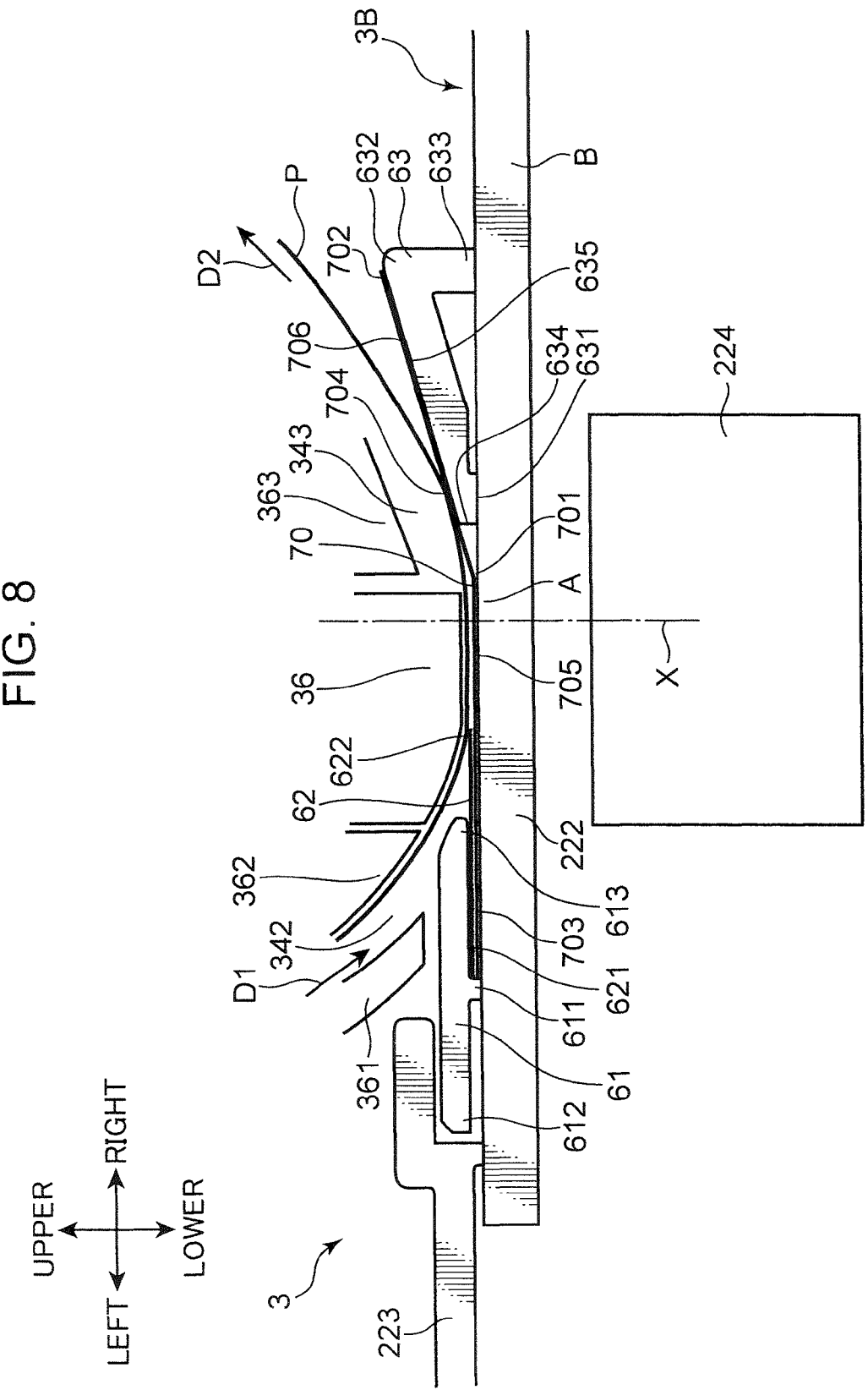
FIG. 8 is an enlarged sectional view showing an essential part of an image reading apparatus according to the embodiment of the present disclosure.

The document discharge guide 63 (guide member) is a part of the upper frame 22A and arranged on the upper surface of the upper frame 22A by manufacturing the upper frame 22A by casting. The document discharge guide 63 corresponds to the boundary between the reading areas A and B and the $13^{th}$ and $21^{st}$ sides 22D, 22F are formed by lateral edges of the document discharge guide 63. With reference to FIG. 8, the document discharge guide 63 includes a first guide leg portion 631 and a second guide leg portion 633 standing from the upper surface of the contact glass 222 and spaced apart from each other in a lateral direction, and a guide inclined portion 635. The first guide leg portion 631 is a wall portion arranged to stand from the upper surface of the contact glass 222 on the reading area A side and the second guide leg portion 633 is a wall portion arranged to stand from the upper surface of the contact glass 222 on the reading area B side. The second guide leg portion 633 is higher than the first guide leg portion 631. The guide inclined portion 635 connects the first and second guide leg portions 631 and 633. The guide inclined portion 635 is a flat portion extending from a guide front wall 634 of the first guide leg portion 631 and inclined at a predetermined angle to be more separated from the contact glass 222 (to be located more upward) toward the second guide leg portion 633.

The side frame 223 is a part of the upper frame 22A and arranged on the upper surface of the upper frame 22A by manufacturing the upper frame 22A by casting. The side frame 223 is located on the left end of the reading area A and functions to protect a sheet holder 61 to be described later.

Figure 7:
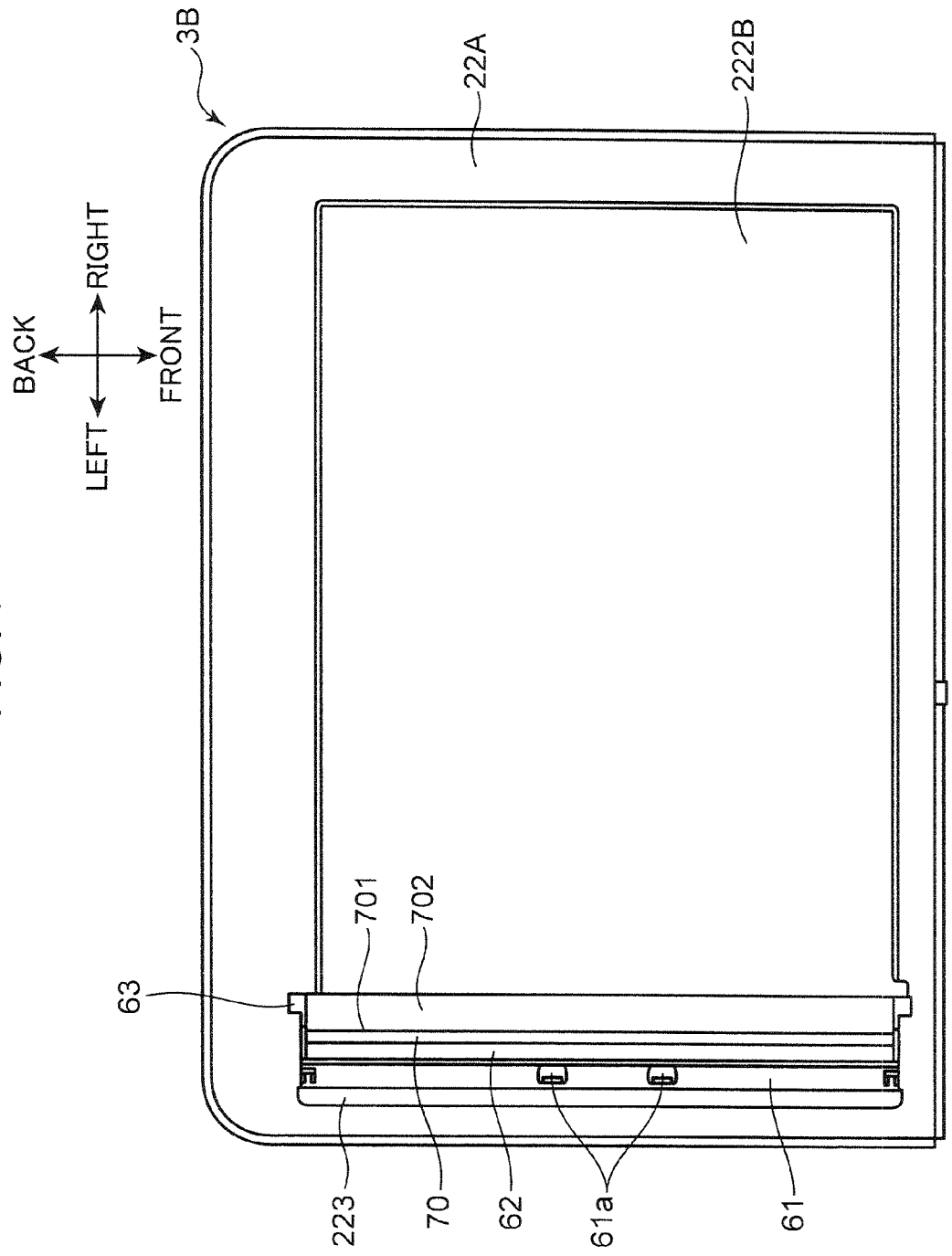
FIG. 7 is a plan view showing the image reading unit according to the embodiment of the present disclosure.

With reference to FIGS. 7 and 8, the image reading unit 3B includes a transparent sheet 70 (transparent sheet member), a conveyance guide sheet 62 (pressing member) and the sheet holder 61 in the reading area A.

In FIG. 8, the document reading position X (first position) where the CIS in the CIS unit 224 reads a document is arranged at a substantially central position of the reading area A in the lateral direction. Further, the second and third conveyance paths 342, 243 in the auto document feeder 3A described above are arranged above the reading area A. Specifically, a document sheet P is conveyed along the second conveyance path 342 from an upper-left side, passes the document reading position X on the contact glass 222 and is conveyed along the third conveyance path 343 toward an upper-right side.

The transparent sheet 70 is a transparent thin sheet member. In this embodiment, a PET film having a thickness of 0.2 mm is used as the material of the transparent sheet 70. Note that other transparent sheet materials can be used as the transparent sheet 70. In this case, the thickness of the transparent sheet 70 is preferably set in the range of 0.1 mm to 0.4 mm. The transparent sheet 70 includes a first sheet portion 705 and a second sheet portion 706. The first sheet portion 705 is arranged on the contact glass 222 to cover the document reading position X from an upstream side to a downstream side in a conveying direction of the document sheet P. The second sheet portion 706 is connected to the first sheet portion 705 at a downstream side of the first sheet portion 705 in the conveying direction and held in contact with the guide inclined portion 635 of the document discharge guide 63. The first sheet portion 705 is arranged to be in close contact with the upper surface of the contact glass 222. Further, the transparent sheet 70 includes a bent portion 701 between the first and second sheet portions 705, 706. Specifically, a part of the transparent sheet 70 upstream of the bent portion 701 in the conveying direction of the document sheet P is the first sheet portion 705 and a part thereof downstream of the bent portion 701 in the conveying direction of the document sheet P is the second sheet portion 706. Further, an anti-reflection treatment is applied to surfaces of the first and second sheet portions 705, 706 of the transparent sheet 70 facing the contact glass 222.

The conveyance guide sheet 62 is arranged upstream of the document reading position X in the conveying direction of the document sheet P. The conveyance guide sheet 62 is a transparent thin sheet member similar to the transparent sheet 70. The same type of material as the transparent sheet 70 is used for the conveyance guide sheet 62. The conveyance guide sheet 62 functions to press the first sheet portion 705 upstream of the document reading position X in the conveying direction against the contact glass 222. Further, a guide sheet leading end portion 622 of the conveyance guide sheet 62 arranged near the document reading position X at the downstream side in the conveying direction is arranged to enter the second conveyance path 342. Thus, the document sheet P being conveyed along the second conveyance path 342 heads for the document reading position X while being held in contact with the guide sheet leading end portion 622.

The sheet holder 61 is arranged on a side of the contact glass 222 upstream of the transparent sheet 70 and the conveyance guide sheet 62 in the conveying direction of the document sheet P. The sheet holder 61 is a plate-like member having a slight height and substantially T-shaped when viewed in the lateral direction. The sheet holder 61 includes a holder supporting portion 611 arranged to stand from the upper surface of the contact glass 222, a holder base end portion 612 (first extending portion) and a holder leading end portion 613 (second extending portion) extending in different lateral directions from the holder supporting portion 611. The holder base end portion 612 is covered from above by the side frame 223 (protecting member). Specifically, the sheet holder 61 is protected by the side frame 223 so that the holder base end portion 612 cannot be touched by a user, whereby the sheet holder 61 is prevented from being inclined to the left about the holder supporting portion 611. Further, the holder leading end portion 613 sandwiches and supports the transparent sheet base end portion 703 of the first sheet portion 705 of the transparent sheet 70 and the guide sheet base end portion 621 of the conveyance guide sheet 62 between itself and the contact glass 222. As shown in FIG. 7, fastening portions 61a are arranged at two positions in a central part of the sheet holder 61 in forward and backward directions. The transparent sheet 70 and the conveyance guide sheet 62 are integrally fixed by these fastening portions 61a to prevent separation from the reading area A. Note that since the inclination of the sheet holder 61 about the holder supporting portion 611 is suppressed by the side frame 223, an upward movement of the holder leading end portion 613 supporting the conveyance guide sheet 62 and the transparent sheet 70 is prevented.

Next, actions appearing in the reading area A in this embodiment are described. A document sheet P fed by the document feeding unit 5 (FIG. 4) of the auto document feeder 3A is carried into the second conveyance path 342 from the first conveyance path 341. Then, the sheet P conveyed along the second conveyance path 342 toward the document reading position X comes into contact with the guide sheet leading end portion 622 of the conveyance guide sheet 62 (FIG. 8). At this time, a moving direction of the document sheet P is changed from a right-downward direction to a horizontal direction. Thus, the document sheet P is conveyed in the substantially horizontal direction above the document reading position X. Then, a document image of the document sheet P passing the document reading position X is read by the CIS unit 224. The document sheet P having passed the document reading position X comes into contact with a transparent sheet contact portion 704 of the second sheet portion 706 held in contact with the document discharge guide 63. At this time, the moving direction of the document sheet P is changed from the substantially horizontal direction to a right-upward direction. The document sheet P having come into contact with the transparent sheet contact portion 704 is conveyed along the third conveyance path 343 toward a further downward side and discharged to the document discharge tray 33 through the discharge opening 30E.

As just described, in this embodiment, the document sheet P conveyed via the document reading position X from the upstream side toward the downstream side in the conveying direction comes into contact with the guide sheet leading end portion 622 at a position upstream of the document reading position X. Further, the document sheet P comes into contact with the transparent sheet contact portion 704 at a position downstream of the document reading position X. Since the document sheet P conveyed from the guide sheet leading end portion 622 toward the transparent sheet contact portion 704 is conveyed in the substantially horizontal direction, the contact of the document sheet P with the first sheet portion 705 of the transparent sheet is prevented. Thus, it is suppressed that the first sheet portion 705 of the transparent sheet 70 is rubbed by the document sheet P and scratched. As a result of this, a noise image caused by this scratch is not included in a read image read by the CIS unit 224. Further, it is not necessary to apply hard coating to the first sheet portion 705 of the transparent sheet 70 to prevent scratching.

Further, in this embodiment, the conveyance guide sheet functions to press the first sheet portion 705 against the contact glass 222. This suppresses an upward movement of the first sheet portion 705 from the contact glass 222 and the contact thereof with the document sheet P. Further, since it is difficult to form an air layer between the first sheet portion 705 and the contact glass 222, it is prevented that reflected light brought about by the CIS unit 224 interferes at a boundary between the air layer and the transparent sheet 70 and a read image includes interference fringes.

Furthermore, in this embodiment, the bent portion 701 is formed between the first and second sheet portions 705, 706 so that the first sheet portion 705 is held in close contact with the contact glass 222. Due to the bent portion 701, the postures of the first and second sheet portions 705, 706 are less affected by each other and a state where the first sheet portion 705 is held in close contact with the contact glass 222 is maintained. Thus, a problem brought about by forming the air layer as described above is prevented.

Further, in this embodiment, a bending angle of the bent portion 701 is set to be equal to an angle of inclination of the guide inclined portion 635 of the document discharge guide 63 extending from the guide front wall 634. As a result, the second sheet portion 706 of the transparent sheet 70 comes into surface contact with the guide inclined portion 635 of the document discharge guide 63. This prevents a part of the transparent sheet around the bent portion 701 from being warped and the bent portion 701 from being lifted from the contact glass 222. It is also prevented that an elastic force is accumulated in the transparent sheet 70 due to the warping of the transparent sheet 70 and an unstable force is applied to the document sheet P when the document sheet P being conveyed comes into contact with the transparent sheet 70.

Note that, as described above, the anti-reflection treatment is applied to the surfaces of the first and second sheet portions 705, 706 of the transparent sheet 70 facing the contact glass 222. When the transparent sheet 70 is arranged on the contact glass 222, a slight air layer may be formed between the contact glass 222 and the first sheet portion 705 of the transparent sheet 70. At this time, reflected light produced at a boundary between the contact glass 222 and the air layer and that produced at a boundary between the air layer and the first sheet portion 705 of the transparent sheet 70 may interfere and an interference fringe pattern may be included in a read image. Thus, by applying the anti-reflection treatment to the surface of the transparent sheet 70 facing the contact glass 222, the interference of the lights is suppressed and the inclusion of the interference fringe pattern in the read image is prevented.

Further, in this embodiment, the transparent sheet base end portion 703 and the guide sheet base end portion 621 are integrally supported by the holder leading end portion 613 at the upstream sides of the transparent sheet 70 and the conveyance guide sheet 62 in the conveying direction. Thus, the close contact of the first sheet portion 705 with the contact glass 222 and the entrance position of the guide sheet leading end portion 622 into the second conveyance path 342 are stably maintained.

Although the image reading apparatus 3 and the image forming apparatus 1 according to this embodiment have been described above, the present disclosure is not limited to these embodiments and may be modified, for example, as follows.

(1) Although the document discharge guide 63 is integrally arranged on the upper frame 22A in this embodiment, there is not limitation to this. Specifically, the document discharge guide 63 may be fixed to the upper frame 22A as a separate member.

(2) Further, although the bent portion 701 is formed between the first and second sheet portions 705, 706 in the transparent sheet 70 in this embodiment, there is not limitation to this. If the close contact of the first sheet portion 705 with the contact glass 222 and the contact surface of the second sheet portion 706 with the document discharge guide 63 are stably ensured, similar effects can be achieved even by another mode. For example, the second sheet portion 706 may be fixed to the document discharge guide 63 over a predetermined width using a double-faced tape.

(3) Further, although a document image of a document sheet P being conveyed is read by the CIS unit 224 at the document reading position X in this embodiment, there is not limitation to this. Various readers including a reduction optical system and a close contact optical system may be adopted as a reader for reading a document image.

(4) Furthermore, a material having a high transmittance (total light transmittance) is preferably used for the above transparent sheet 70 so as not to affect the reading of a document image by the CIS unit 224, but a material having a lower transmittance than the contact glass 222 may be used. In this case, the material cost of the transparent sheet 70 is reduced. On the other hand, if the transmittance of the transparent sheet 70 is lower than that of the contact glass 222 in this way, the quantity of light irradiated to a document by the CIS unit 224 is lower when a document image of a document sheet P being conveyed is read in the reading area A than when a document image of a stationary document is read in the reading area B. This is because the stationary document receives irradiated light having passed only through the contact glass 222 in the reading area B, but the document sheet P receives irradiated light having passed through the contact glass 222 and the transparent sheet 70 in the reading area A. As a result, a printed image formed based on the document image of the document sheet P has a lower density than a printed image formed based on the document image of the stationary document.

In this case, the image processing unit 225 (image corrector) preferably performs different image correcting operations between the case where the document image of the document sheet P being conveyed is read in the reading area A and the case where the document image of the stationary image is read in the reading area B.

For example, if a light quantity distribution of illumination light irradiated to a document is nonuniform and light reception sensitivity varies among light receiving elements, the reading quality of image data is reduced. Thus, the image processing unit 225 has a shading correction function. The CIS unit 224 includes an unillustrated white reference plate (reference plate used to measure a white reference value). The CIS unit 224 receives reflected light obtained by irradiating illumination light to the white reference plate or the like using light receiving elements (not shown). Then, based on this reflected light, the image processing unit 225 obtains shading correction data for each light receiving element and corrects document image data read from a document using this data. Such a shading correcting function is a function of correcting the nonuniformity of the light quantity distribution of illumination light and a variation in light reception sensitivity among the light receiving elements.

Utilizing this shading correcting function, the image processing unit 225 adds (or subtracts) correction data stored beforehand in an unillustrated storage to (or from) the shading correction data if a document image of a document sheet P being conveyed is read in the reading area A. In this way, the density of the printed image formed based on the document image of the document sheet P can be approximated to that of the printed image formed based on the document image of the stationary document.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
    a first housing;
    a second housing which is openable and closable relative to the first housing;
    a document conveyance path which is arranged in the second housing and conveys a document so that the document passes a first position on the first housing facing the second housing in a closed state;
    a plate-like transparent member which is so arranged opposite to the second housing in the first housing as to include the first position and a second position which is adjacent to the first position and where a stationary document is placed on the upper surface of the transparent member with a document surface faced down;
    a reader which is arranged in the first housing and reads an image of the document or the stationary document at the first or second position via the transparent member;
    a guide member which is arranged on the transparent member at a side downstream of the first position in a conveying direction of the document and guides the document to a downstream side in the conveying direction;
    a transparent sheet member which includes a first sheet portion which is arranged on the transparent member to cover the first position from the upstream side to the downstream side in the conveying direction and a second sheet portion which is held in contact with the guide member to extend along the guide member and with which the document being conveyed along the document conveyance path comes into contact; and
    a pressing member which is a transparent sheet and presses a side of the first sheet portion upstream of the first position in the conveying direction against the transparent member, wherein a downstream end portion of the pressing member in the conveying direction is arranged to enter a part of the document conveyance path upstream of the first position in the conveying direction so that the document being conveyed along the document conveyance path comes into contact with the downstream end portion of the pressing member.

2. An image reading apparatus according to claim 1, wherein:
    the transparent sheet member includes a bent portion which is arranged downstream of the first sheet portion in the conveying direction;
    a side of the transparent sheet member upstream of the bent portion is the first sheet portion;
    a side of the transparent sheet member downstream of the bent portion is the second sheet portion; and
    the bent portion is so bent that the first sheet portion is held in close contact with the transparent member.

3. An image reading apparatus according to claim 2, wherein:
    the guide member includes a standing wall standing from the transparent member at a side downstream of the first position in the conveying direction and an inclined portion connected to the standing wall and inclined in a direction to be more separated from the transparent member toward the downstream side in the conveying direction; and the second sheet portion is held in surface contact with the inclined portion of the guide member.

4. An image reading apparatus according to claim 1, wherein:

an anti-reflection treatment is applied to a surface of the transparent sheet member facing the transparent member.

5. An image reading apparatus according to claim 1, further comprising:

a supporting member which supports an upstream end portion of the first sheet portion of the transparent sheet member in the conveying direction and an upstream end portion of the pressing member in the conveying direction.

6. An image reading apparatus according to claim 1, wherein:

the transparent sheet member has a lower transmittance than the transparent member;

the image reading apparatus further comprises an image corrector which corrects an image read by the reader; and the image corrector performs different image corrections between an image of the document read at the first position and an image of the stationary document read at the second position.

7. An image reading apparatus according to claim 5, wherein:

the supporting member includes a supporting portion standing from the transparent member and a first extending portion and a second extending portion extending in different directions from the supporting portion;

the end portion of the first sheet portion of the transparent sheet member and the end portion of the pressing member are supported in a state sandwiched between the second extending portion and the transparent member; and the image reading apparatus further comprises a protecting member which covers the first extending portion from above and protects the first extending portion.

8. An image forming apparatus, comprising:

an image reading apparatus for reading an image of a document; and an image forming station for forming an image on a sheet based on an image read by the image reading apparatus;

wherein the image reading apparatus includes:

a first housing;

a second housing which is openable and closable relative to the first housing;

a document conveyance path which is arranged in the second housing and conveys a document so that the document passes a first position on the first housing facing the second housing in a closed state;

a plate-like transparent member which is so arranged opposite to the second housing in the first housing as to include the first position and a second position which is adjacent to the first position and where a stationary document is placed on the upper surface of the transparent member with a document surface faced down;

a reader which is arranged in the first housing and reads the document or the stationary document at the first or second position via the transparent member;

a guide member which is arranged on the transparent member at a side downstream of the first position in a conveying direction of the document and guides the document to a downstream side in the conveying direction;

a transparent sheet member which includes a first sheet portion which is arranged on the transparent member to cover the first position from the upstream side to the downstream side in the conveying direction and a second sheet portion which is held in contact with the guide member to extend along the guide member and with which the document being conveyed along the document conveyance path comes into contact; and a pressing member which is a transparent sheet and presses a side of the first sheet portion upstream of the first position in the conveying direction against the transparent member, wherein a downstream end portion of the pressing member in the conveying direction is arranged to enter a part of the document conveyance path upstream of the first position in the conveying direction so that the document being conveyed along the document conveyance path comes into contact with the downstream end portion of the pressing member.

* * * * *